(12) United States Patent
Du

(10) Patent No.: US 10,884,691 B2
(45) Date of Patent: *Jan. 5, 2021

(54) DISPLAY CONTROL METHODS AND APPARATUSES

(71) Applicant: Beijing Zhigu Rui Tuo Tech Co., Ltd, Beijing (CN)

(72) Inventor: Lin Du, Beijing (CN)

(73) Assignee: BEIJING ZHIGU RUI TUO TECH CO., LTD, Beijing (CN)

( * ) Notice: Subject to any disclaimer, the term of this patent is extended or adjusted under 35 U.S.C. 154(b) by 274 days.

This patent is subject to a terminal disclaimer.

(21) Appl. No.: 15/170,245

(22) Filed: Jun. 1, 2016

(65) Prior Publication Data

US 2016/0357494 A1 Dec. 8, 2016

(30) Foreign Application Priority Data

Jun. 5, 2015 (CN) .......................... 2015 1 0305630

(51) Int. Cl.
*G06F 3/14* (2006.01)
*G09G 3/00* (2006.01)
(Continued)

(52) U.S. Cl.
CPC ........... *G06F 3/1446* (2013.01); *G02B 30/26* (2020.01); *G09G 3/002* (2013.01); *G09G 3/003* (2013.01);
(Continued)

(58) Field of Classification Search
None
See application file for complete search history.

(56) References Cited

U.S. PATENT DOCUMENTS

| 5,499,138 A | 3/1996 | Iba |
| 5,764,319 A | 6/1998 | Nishihara |

(Continued)

FOREIGN PATENT DOCUMENTS

| CN | 1093181 A | 10/1994 |
| CN | 1419787 A | 5/2003 |

(Continued)

OTHER PUBLICATIONS

Office Action dated Feb. 23, 2018 for U.S. Appl. No. 15/170,214, 91 pages.

(Continued)

*Primary Examiner* — Benjamin X Casarez
(74) *Attorney, Agent, or Firm* — Amin, Turocy & Watson, LLP

(57) ABSTRACT

Various display control methods and apparatuses are provided. A method comprises inclining at least one display unit relative to an initial normal thereof to change a ratio of pixels distributed along two directions in each effective display region of the at least one display unit of a display system, wherein light emitted by each pixel in the effective display region of each display unit in the at least one display unit is transmitted to a visual angle range by a lens corresponding to the display unit in the display system, and the two directions comprise a first direction and a second direction parallel with the display unit and orthogonal with each other; and displaying a content to be displayed by the changed display system. Accordingly, differentiated display of visual angle information of two mutually orthogonal different directions can be realized.

40 Claims, 9 Drawing Sheets

(51) Int. Cl.
  *H04N 13/307* (2018.01)
  *G02B 30/26* (2020.01)
  *G02B 30/27* (2020.01)
(52) U.S. Cl.
  CPC .......... *H04N 13/307* (2018.05); *G02B 30/27* (2020.01); *G09G 2320/028* (2013.01); *G09G 2320/068* (2013.01)

(56) References Cited

U.S. PATENT DOCUMENTS

| | | | |
|---|---|---|---|
| 7,359,120 | B1* | 4/2008 | Raymond .............. G02B 30/27 359/626 |
| 2003/0161040 | A1 | 8/2003 | Ishii et al. |
| 2004/0150583 | A1 | 8/2004 | Fukushima et al. |
| 2005/0264881 | A1 | 12/2005 | Takagi et al. |
| 2007/0052729 | A1 | 3/2007 | Fukushima et al. |
| 2007/0229495 | A1 | 10/2007 | Ito |
| 2008/0112056 | A1 | 5/2008 | Raymond et al. |
| 2008/0204663 | A1* | 8/2008 | Balogh .............. G02B 27/2214 353/10 |
| 2008/0218433 | A1 | 9/2008 | Hong et al. |
| 2008/0224951 | A1 | 9/2008 | Alberth |
| 2009/0079733 | A1* | 3/2009 | Fukushima ........ H04N 13/0404 345/419 |
| 2009/0231698 | A1 | 9/2009 | Hashimoto et al. |
| 2011/0242103 | A1* | 10/2011 | Han ................... H04N 13/0022 345/419 |
| 2012/0019676 | A1 | 1/2012 | Foote |
| 2012/0075166 | A1* | 3/2012 | Marti ...................... G06F 3/011 345/1.1 |
| 2012/0182292 | A1 | 7/2012 | Shimoyama et al. |
| 2012/0182326 | A1 | 7/2012 | Moore |
| 2012/0188245 | A1 | 7/2012 | Hyatt |
| 2013/0010263 | A1* | 1/2013 | Wang ................. G02B 27/2292 353/7 |
| 2013/0033748 | A1* | 2/2013 | Mathai .............. G02B 27/2264 359/463 |
| 2013/0182319 | A1 | 7/2013 | Chung |
| 2013/0229336 | A1 | 9/2013 | Shimoyama et al. |
| 2013/0258451 | A1* | 10/2013 | El-Ghoroury ........ G02B 26/101 359/298 |
| 2013/0335459 | A1* | 12/2013 | Tokoo ................... G02F 1/1313 345/690 |
| 2014/0055693 | A1 | 2/2014 | Nam et al. |
| 2014/0078268 | A1 | 3/2014 | Watanabe et al. |
| 2014/0085719 | A1 | 3/2014 | Hamagishi et al. |
| 2014/0168395 | A1 | 6/2014 | Iwane |
| 2014/0225940 | A1* | 8/2014 | Nakagawa .......... G09G 3/3607 345/690 |
| 2014/0293759 | A1 | 10/2014 | Taff et al. |
| 2014/0300711 | A1 | 10/2014 | Kroon et al. |
| 2014/0300714 | A1* | 10/2014 | Muller ............... H04N 13/0404 348/54 |
| 2014/0340390 | A1 | 11/2014 | Lanman et al. |
| 2014/0347361 | A1 | 11/2014 | Alpaslan et al. |
| 2015/0287158 | A1 | 10/2015 | Cerny et al. |
| 2015/0304644 | A1* | 10/2015 | Kim ................... H04N 13/0447 348/54 |
| 2015/0334379 | A1 | 11/2015 | Du et al. |
| 2016/0021367 | A1 | 1/2016 | Yoon et al. |
| 2016/0291336 | A1 | 10/2016 | Yoshida |
| 2016/0357494 | A1 | 12/2016 | Du |
| 2016/0358522 | A1* | 12/2016 | Du ......................... G09G 3/001 |
| 2016/0370588 | A1 | 12/2016 | Parker et al. |
| 2017/0059960 | A1 | 3/2017 | Shi et al. |
| 2017/0171533 | A1 | 6/2017 | Benitez et al. |
| 2017/0264891 | A1* | 9/2017 | Iwasaki ................. G03B 35/24 |
| 2017/0315367 | A1* | 11/2017 | Maruyama ......... G02B 27/0179 |
| 2017/0353717 | A1 | 12/2017 | Zhou et al. |
| 2017/0372683 | A1 | 12/2017 | Du et al. |
| 2018/0033356 | A1 | 2/2018 | Zhou et al. |

FOREIGN PATENT DOCUMENTS

| | | |
|---|---|---|
| CN | 1472592 A | 2/2004 |
| CN | 1717929 A | 1/2006 |
| CN | 1925628 A | 3/2007 |
| CN | 1954257 A | 4/2007 |
| CN | 101154329 A | 4/2008 |
| CN | 101394572 A | 3/2009 |
| CN | 102186044 A | 9/2011 |
| CN | 102193196 A | 9/2011 |
| CN | 102332090 A | 1/2012 |
| CN | 202424936 U | 9/2012 |
| CN | 102880337 A | 1/2013 |
| CN | 102971660 A | 3/2013 |
| CN | 103348687 A | 10/2013 |
| CN | 103454806 A | 12/2013 |
| CN | 103530845 A | 1/2014 |
| CN | 103534745 A | 1/2014 |
| CN | 103607553 A | 2/2014 |
| CN | 103795997 A | 5/2014 |
| CN | 104159025 A | 11/2014 |
| CN | 104423051 A | 3/2015 |
| CN | 104469343 A | 3/2015 |
| CN | 104469344 A | 3/2015 |
| CN | 104519347 A | 4/2015 |
| CN | 104537975 A | 4/2015 |
| TW | 201018994 A | 5/2010 |
| WO | 01/56298 A1 | 8/2001 |
| WO | 2014133481 | 9/2014 |

OTHER PUBLICATIONS

Office Action dated Apr. 19, 2018 for U.S. Appl. No. 15/170,308, 82 pages.
Office Action for Chinese Application Serial No. 201510305630.4 dated May 3, 2018, 9 pages (with translation).
Chinese Office Action dated Nov. 21, 2018 for Chinese Patent Application No. 201510303176.9, 16 pages (including translation).
Chinese Office Action dated Jan. 9, 2019 for Chinese Patent Application No. 201510305629.1, 14 pages (including translation).
Office Action dated Dec. 28, 2018 for U.S. Appl. No. 15/170,214, 96 pages.
Office Action dated Sep. 12, 2018 for U.S. Appl. No. 15/170,214, 99 pages.
Office Action dated Nov. 29, 2018 for U.S. Appl. No. 15/170,308, 90 pages.
Final Office Action received for U.S. Appl. No. 15/170,214 dated Jul. 10, 2019, 96 pages.
Non-Final Office Action received for U.S. Appl. No. 15/170,308 dated May 30, 2019, 129 pages.
Second Office Action received for Chinese Patent Application Serial No. 201510305629.1 dated Jul. 30, 2019, 18 pages (including English Translation).
Second Office Action received for Chinese Patent Application Serial No. 201510303176.9 dated May 20, 2019, 8 pages.
Non-Final Office Action received for U.S. Appl. No. 15/170,214 dated Jan. 7, 2020, 102 pages.
Final Office Action received for U.S. Appl. No. 15/170,308 dated Dec. 11, 2019, 141 pages.
Final Office Action received for U.S. Appl. No. 15/170,214 dated Jul. 9, 2020, 120 pages.
Non-Final Office Action received for U.S. Appl. No. 15/170,308 dated May 27, 2020, 150 pages.

* cited by examiner

Incline at least one display unit relative to an initial normal thereof to change a ratio of pixels distributed along two directions in each effective display region of the at least one display unit of a display system, wherein light emitted by each pixel in the effective display region of each display unit in the at least one display unit is transmitted to a visual angle range by a lens corresponding to the display unit in the display system, and the two directions comprise a first direction and a second direction parallel with the display unit and orthogonal with each other ⟶ S101

Display a content to be displayed by the changed display system ⟶ S102

FIG. 1

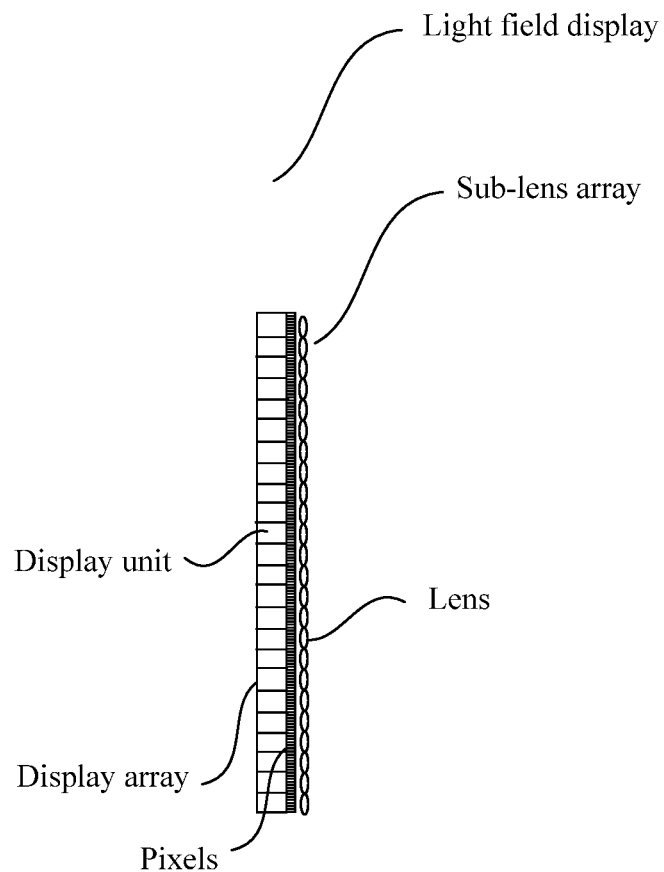

FIG. 2

DISPLAY CONTROL METHODS AND APPARATUSES

RELATED APPLICATION

The present application claims the benefit of priority to Chinese Patent Application No. 201510305630.4, filed on Jun. 5, 2015, and entitled "Display Control Methods and Apparatuses", which application is hereby incorporated into the present application by reference herein in its entirety.

TECHNICAL FIELD

The present application relates to the technical field of display, and, for example, to various display control methods and apparatuses.

BACKGROUND

Along with more and more individualized requirements of a user on the display image, a traditional display technology-based improvement technology continuously gets rid of the stale and brings forth the fresh, for example, technologies such as a display array and light field display can realize relatively flexible display effects such as light field reconfiguration and vision correction display by similar hardware structures of the traditional display technology.

SUMMARY

The following gives brief description of the present application to provide basic understandings on some aspects of the present application. It should be understand that the description is not an exhaustion description of the present application. It intends to determine neither key or important parts of the present application or a scope of the present application, and merely aims to give some concepts in a simplifying manner, thereby serving as a preorder of the more detailed description discussed later.

The present application provides various display control methods and apparatuses.

On a first aspect, an embodiment of the present application provides a display control method, comprising:

inclining at least one display unit relative to an initial normal thereof to change a ratio of pixels distributed along two directions in each effective display region of the at least one display unit of a display system, wherein light emitted by each pixel in the effective display region of each display unit in the at least one display unit is transmitted to a visual angle range by a lens corresponding to the display unit in the display system, and the two directions comprise a first direction and a second direction parallel with the display unit and orthogonal with each other; and displaying a content to be displayed by the changed display system.

On a second aspect, an embodiment of the present application further provides a display control apparatus, comprising an inclining control module, configured to incline at least one display unit relative to an initial normal thereof to change a ratio of pixels distributed along two directions in each effective display region of the at least one display unit of a display system, wherein light emitted by each pixel in the effective display region of each display unit in the at least one display unit is transmitted to a visual angle range by a lens corresponding to the display unit in the display system, and the two directions comprise a first direction and a second direction parallel with the display unit and orthogonal with each other; and a display control module, configured to display a content to be displayed by the changed display system.

On a third aspect, an embodiment of the present application provides another display control apparatus, comprising:

a processor, a communication interface, a memory and a communication bus; the processor, the communication interface and the memory finish mutual communication by the communication bus;

the memory is configured to store at least one command; the at least one command enables the processor to execute following operations:

inclining at least one display unit relative to an initial normal thereof to change a ratio of pixels distributed along two directions in each effective display region of the at least one display unit of a display system, wherein light emitted by each pixel in the effective display region of each display unit in the at least one display unit is transmitted to a visual angle range by a lens corresponding to the display unit in the display system, and the two directions comprise a first direction and a second direction parallel with the display unit and orthogonal with each other; and displaying a content to be displayed by the changed display system.

According to one or more example embodiments of the present application, a manner of inclining at least one display unit relative to an initial normal thereof is adopted to change a ratio of pixels distributed along the first direction and the second direction in each effective display region of at least one display unit, to cause that in each effective display region of the at least one display unit, a quantity of pixels distributed along the first direction and a quantity of pixels distributed along the second direction are different, a pixel ratio of the two is not equal to 1, thus, by using the display system with the at least one inclined display unit for content display, a proportion of practically displayed parallax information of the at least one display unit respectively displayed in the first direction and the second direction is changed, and differentiated display of the visual angle information in different directions is realized to cause the practically displayed content to present differentiated angle resolutions of different directions, thereby better meeting diversified practical application requirements.

By following detailed description on optional embodiments of the present application in combination with drawings, these and other advantages of the present application will be more obvious.

BRIEF DESCRIPTION OF THE DRAWINGS

The present application will be better understood in reference to the description given in combination with the drawings, same or similar drawing marks used in all drawings to denote same or similar parts. The drawings together with the detailed description are contained in the present description and form a part of the present description, and are used for further exampling to describe the optional embodiments of the present application and explain principles and aspects of the present application. In the drawings:

FIG. 1 is a flow chart of a display control method according to an example embodiment of the present application;

FIG. 2 is a structural schematic diagram of a light field display according to an example embodiment of the present application;

Figure 3:
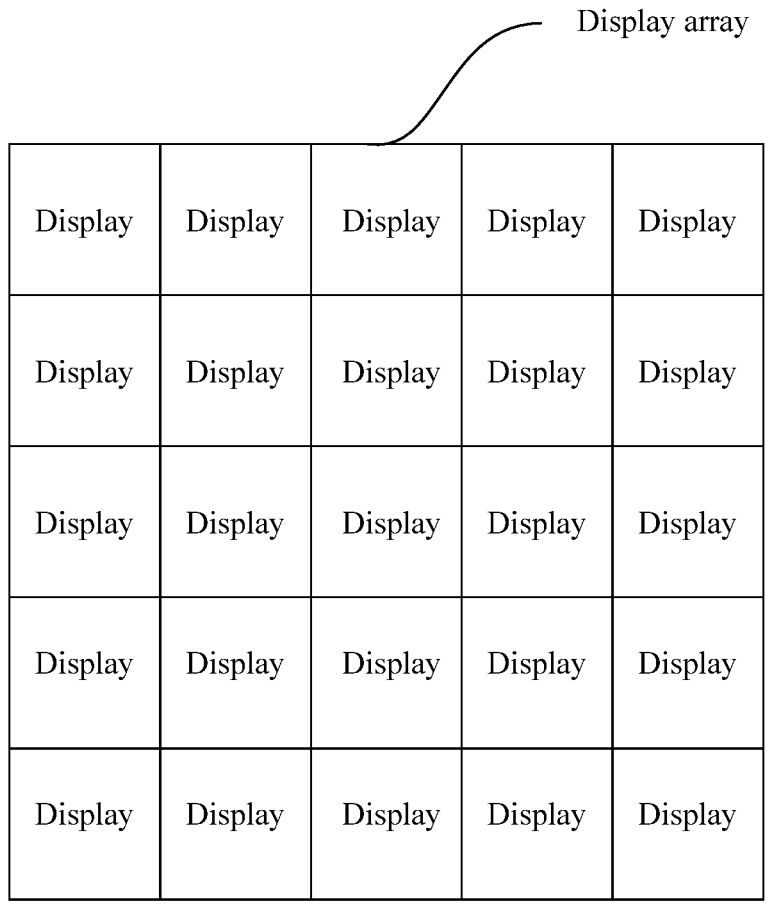
FIG. 3 is a structural schematic diagram of a display array according to an example embodiment of the present application.

Those skilled should understand that elements in the drawings are merely for the purpose of simplicity and clearness and are not drawn in proportion. For example, sizes of some elements in the drawings are amplified relative to other elements, to help to improve understandings on the embodiments of the present application.

DETAILED DESCRIPTION

The following will describe exemplary embodiments of the present application in detail in combination with the drawings. For the purpose of clearness and briefness, not all characteristics of practical embodiments are described in the description. However, it should be understood that in a process of developing such practical embodiments, many decisions specific to the embodiments have to be made to facilitate developers to realize specific targets, for example, those conditions related to the system and business, and those conditions may be changed along with difference of the embodiments.

In addition, it also should be indicated that in order to prevent unnecessary details from blurring the present application, only apparatus structures and/or processing steps tightly related to solutions according to the present application are described in the drawings and description, and presentation and description of parts and processing known by those common skilled in the art and unrelated to the present application are omitted.

Example embodiments of the present application are described in further detail below with reference to the drawings (in which like elements are denoted by like reference numerals) and corresponding description. The following embodiments are intended to describe the present application, but not to limit the scope of the present application.

A person of ordinary skill in the art should understand that the terms "first" and "second" in the present application merely intend to differentiate different steps, devices or modules, and present neither any specific technical meaning nor necessary logic sequence among the different steps, devices or modules.

FIG. 1 is a flow chart of a display control method according to an embodiment of the present application. An execution body of a display control method according to the embodiment of the present application can be some display control apparatus, the display control apparatus can conduct display control of content by executing the display control method in an application process comprising but not limited to content presentation, video display, etc. For example, the display control apparatus can be some or one independent part, which matches and communicates with a display system comprising display unit; or the display control apparatus can be integrated in the display system comprising the display unit as certain function module. Specifically, as shown in FIG. 1, the display control method according to an embodiment of the present application comprises:

S101: Incline at least one display unit relative to an initial normal thereof to change a ratio of pixels distributed along two directions in each effective display region of the at least one display unit of a display system, wherein light emitted by each pixel in the effective display region of each display unit in the at least one display unit is transmitted to a visual angle range by a lens corresponding to the display unit in the display system, and the two directions comprise a first direction and a second direction parallel with the display unit and orthogonal with each other.

S102: Display a content to be displayed by the changed display system.

The initial normal of the display unit according to the embodiment of the present application is a normal direction when the display unit is in a non-inclined state, usually, in the display system according to the embodiment of the present application, the lens and the display unit are correspondingly arranged, the initial normal of the display unit is parallel with the optical axis of the lens, and the initial normal and the optical axis of the lens are parallel with a horizontal plane.

The display unit comprises a plurality of pixels in array distribution, for a display system with functions such as light field reconfiguration or vision correction display, generally not all pixels of each display unit participate in essence display of the content; light emitted from partial pixels in the display unit is transmitted to certain visual angle range of the display system by a lens corresponding to the display unit, and these pixels are positioned in an effective region of the display unit; light emitted by other partial pixels of the display unit cannot be transmitted to the visual angle range even being redirected by the lens corresponding to the display unit, and these pixels are positioned in regions outside the effective region of the display unit, which are called as ineffective regions.

Sometimes, the display unit is a square, the effective region of the display unit is a round region in the square, other regions besides the round region of the display unit are ineffective regions, and light emitted by each pixel in the round region (effective region) can be transmitted to a visual angle range of the display system by a lens corresponding to the display unit. Quantities of the pixels distributed along different directions in the effective region of the display unit are equal, a ratio (pixel ratio) of the quantities of pixels distributed along different directions in the effective region is 1, for example, the quantities of the pixels distributed along two orthogonal directions (first direction and second direction) vertical to a normal in the effective region are equal, a pixel ratio is equal to 1, the effective region provides quantities of the pixels of same proportions for the visual angle information display of the two directions, and proportions of amounts of information of the two directions in the visual angle information displayed by the effective region are equal.

However, in some cases, the visual angle information of different directions has different meanings and/or actions. For example, in a scene using the display system for light field reconfiguration, since human eyes are more sensitive to display details in a horizontal direction, expect to obtain a higher angle resolution in the horizontal direction and are insensitive to the display details in a vertical direction, etc. By adopting a traditional manner for content display, visual angle information of the same proportion of different directions can be obtained, and the display manner cannot make full use of a pixel resource of the display unit to meet differentiated display requirements on the visual angle information proportion of different directions.

According to one or more example embodiments of the present application, a manner of inclining at least one display unit relative to an initial normal thereof is adopted to change a ratio of pixels distributed along the first direction and the second direction in each effective display region of at least one display unit to cause that in each effective display region of the at least one display unit, a quantity of pixels distributed along the first direction and a quantity of pixels distributed along the second direction are different, a pixel ratio of the two is not equal to 1, thus, by using the display system with the at least one inclined display unit for content display, a proportion of practically displayed parallax information of the at least one display unit respectively displayed in the first direction and the second direction is changed, and differentiated display of the visual angle information in different directions is realized to cause the practically displayed content to present differentiated angle resolutions of different directions, thereby better meeting diversified practical application requirements.

A display system capable of being applied by the example embodiment of the present application has a characteristic of adopting a plurality of pixels to display visual information of different directions of a same object in the content to be displayed, according to difference of the display systems, the pixels for displaying visual information of different directions of the same object in the content to be displayed can be concentrated and distributed in certain display unit, or dispersed and distributed in different display units, etc. The at least one display unit comprises situations of a display unit and a plurality of display units. Optionally, if the pixels for displaying visual information of different directions of the same object in the content to be displayed are concentrated and distributed in certain display unit, a ratio of the pixels along two orthogonal directions of the display unit can be changed, thereby changing the proportions of parallax information practically respectively displayed by the display unit in the first direction and the second direction, and realizing differentiated display of the display unit for the visual angle information in different directions. Or, optionally, if the pixels for displaying visual information of different directions of the same object in the content to be displayed are concentrated and distributed in a plurality of display units, the display units can be determined to change a pixel ratio along two orthogonal directions of each of the display units, thereby changing the proportions of parallax information practically respectively displayed in the first direction and the second direction by each of the display units, and realizing differentiated display of the display unit for the visual angle information in different directions. Or, a pixel ratio along the two directions of each display unit in the display system can be changed to realize the differentiated display of each display for the visual angle information of different directions.

Optionally, the display system comprises a light field display, as shown in FIG. 2, the light field display comprises a display array and a sub-lens array, which are arranged in sequence, the sub-lens array comprises a plurality of lens in array distribution, and the display array comprises a plurality of display units in array distribution. In an optional realizing manner for content display based on the light field display, the multidirectional visual angle information of at least one object in the content to be displayed is respectively displayed by the pixels of the one of the at least one display unit, in other words, the multidirectional visual angle information of certain object in the content to be displayed is displayed by the pixels of the same display unit. In another optional realizing manner for content display based on the light field display, the multifunctional visual angle information of at least one object in the content is displayed by at least two of the at least one display unit, in other words, the multifunctional visual angle information of at least one object in the content is displayed by at least two display units, and practically displayed parts of the at least two display units have overlapping of certain extent. The light field display based on any foregoing realizing display manner can realize display effects of light field reconfiguration, vision correction display, etc., and light transmitted by each lens of the sub-lens array at least contains the multi-visual angle information of certain object. In the solution, by changing a ratio of the pixels along two orthogonal directions of the at least one display unit of the light field display, a proportion of respectively practically displayed parallax information of the at least one display unit in the first direction and the second direction can be changed, and differentiated display of the visual angle information in different directions is realized to cause the practically displayed content to present differentiated angle resolutions in different directions, thereby better meeting diversified practical application requirements.

Optionally, the display system comprises a display array, as shown in FIG. 3, the display array comprises a plurality of displays in array distribution, and the display comprises one display unit and one lens arranged in sequence. In a realizing manner of for content display based on the display array, the multidirectional visual angle information of certain object the content to be displayed is displayed by each display unit of the displays, and light of each display unit is redirected by each corresponding lens and reconfigured to a light field comprising the multi-visual angle information in a space. In the solution, by changing the pixel ratio of each of the display units of the display array along two orthogonal directions, a proportion of respectively practically displayed parallax information of the display units in the first direction and the second direction can be changed, and differentiated display of the multidirectional visual angle information in different directions is realized to cause the practically displayed content to present differentiated angle resolutions of different directions, thereby better meeting diversified practical application requirements.

Figure 4A:
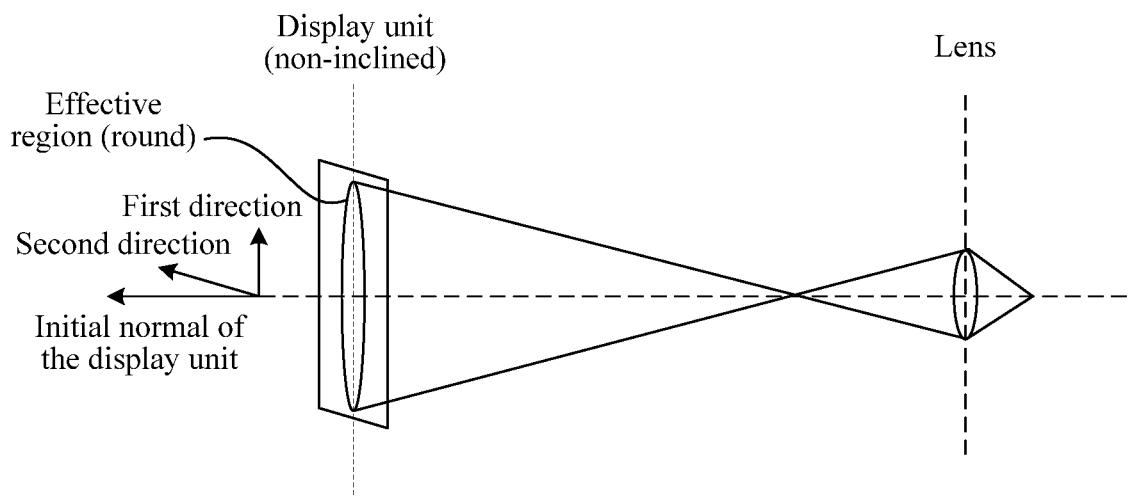
FIG. 4a is a light path illustration based on a non-inclined display unit according to an example embodiment of the present application.

Usually, when the display unit is in the non-inclined state, as shown in FIG. 4a, the display unit is vertical to the initial normal thereof, the initial normal is parallel with an optical axis of the lens, in the display unit, an enveloping region of each pixel emitting light to certain visual angle range by the lens corresponding to the display unit is approximately a round region, namely, the shape of the effective region is approximately round, and a ratio of pixels distributed along the first direction and the second direction in the effective region is equal to or approximate to 1.

Figure 4B:
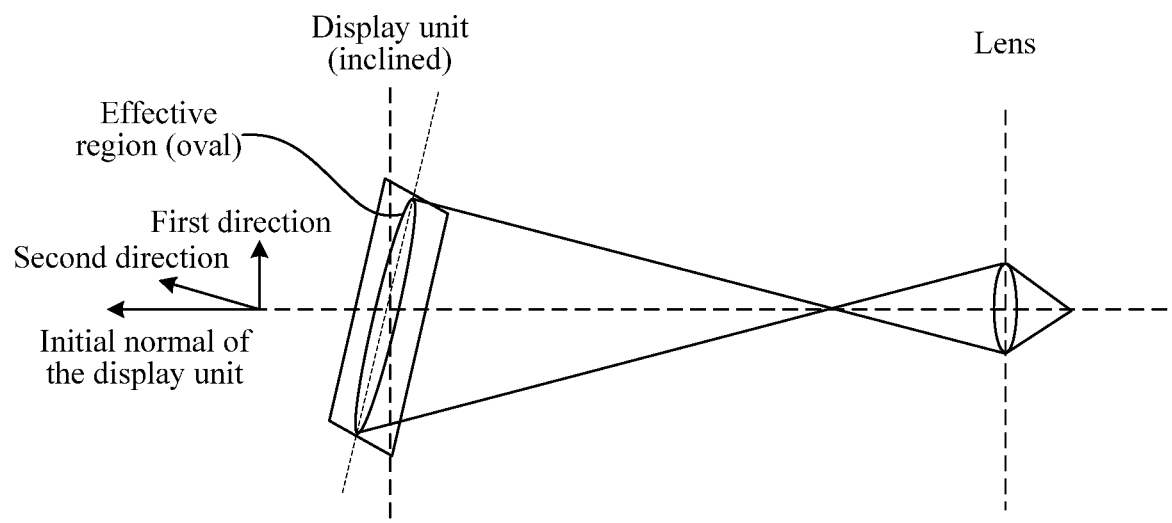
FIG. 4b is a light path illustration based on an inclined display unit according to an example embodiment of the present application.
Figure 4C:
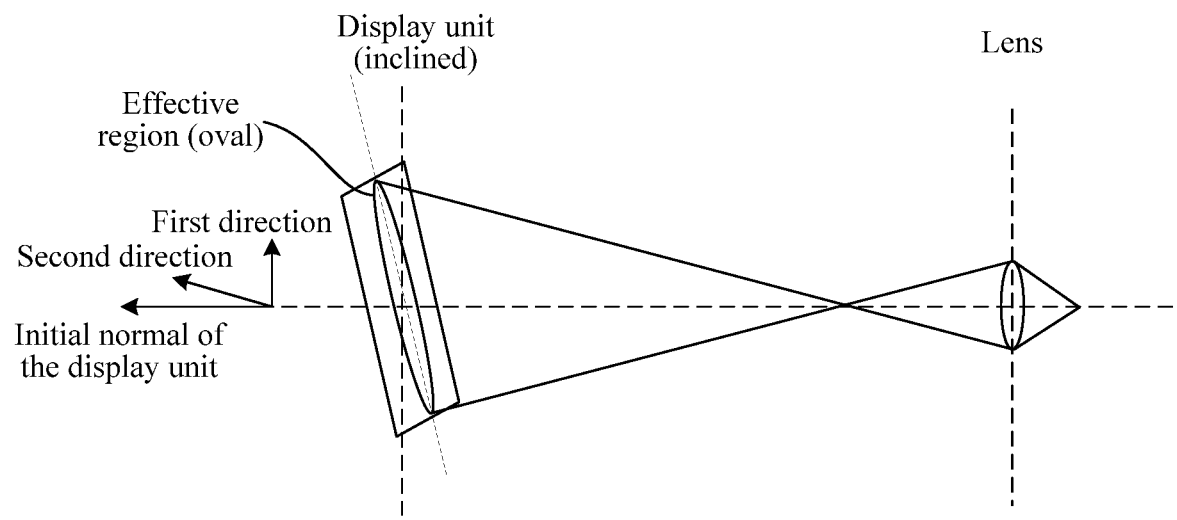
FIG. 4c is a light path illustration based on another inclined display unit according to an example embodiment of the present application.

After the display unit is inclined by an angle relative to the initial normal thereof, as shown in FIG. 4b or FIG. 4c, in the display unit, the enveloping region of each pixel emitting light to certain visual angle range by the lens corresponding to the display unit becomes oval from round, quantities of the pixels distributed along the first direction and the second direction in the effective region with the changed shape are changed, that is to say, the pixel ratio of the two directions is not equal to 1.

Pixel distribution characteristics of the effective region with the changed shape in the display unit relate to an inclining manner and an inclining angle of the display unit relative to the initial normal thereof, the inclining manner and the inclining angle of the display unit can be flexibly controlled to cause the ratio of the pixels distributed along the two directions in the effective region with the changed shape to meet practical application requirements. For example, the at least one display unit is inclined by an angle relative to the first direction to change the shape of each effective region of the at least one display unit, thereby increasing the quantity of the pixels distributed along the first direction in each effective region of the at least one display unit, in such case, the effective region with the changed shape of the display unit is an oval of which the long axis is parallel with the first direction, and the quantity of the pixels distributed along the first direction in the effective region is more than the quantity of the pixels distributed along the second direction in the effective region; or the at least one display unit is inclined by an angle relative to the second direction to change the shape of each effective region of the at least one display unit, thereby increasing the quantity of the pixels distributed along the second direction in each effective region of the at least one display unit, in such case, the effective region with the changed shape of the display unit is an oval of which the long axis is parallel with the second direction, and the quantity of the pixels distributed along the second direction in the effective region is more than the quantity of the pixels distributed along the first direction in the effective region, etc. The pixel distribution characteristics possibly generated by inclining certain display unit relative to the initial normal thereof are indicated by examples.

In one optional situation, the quantity of pixels distributed along the first direction in the effective region with the changed shape is increased, while the quantity of pixels distributed along the second direction is unchanged, thereby changing a ratio of the pixels distributed along two directions in the effective region. The situation can increase the visual information display amount of the first direction and realize the differentiated display of the visual information in the two directions. In addition, the display unit comprises a plurality of pixels in array distribution, generally, the effective region comprises partial pixels of the display unit, that is to say, the pixels in ineffective regions outside the effective region of the display unit do not practically record light information in an image display process, thereby causing the pixels of the display units to not be fully used; due to the situation, the display unit with adjusted pixel distribution can increase the pixels distributed along the first direction in the effective region, and a proportion of ineffective pixels of the display unit is reduced, thereby improving a practical use ratio of the pixels of the display unit.

In another optional situation, thereby reducing the quantity of the pixels distributed along the first direction in the effective region with the changed shape is unchanged, while the quantity of the pixels distributed along the second direction is reduced, thereby changing a ratio of the pixels distributed along the two directions in the effective region. The situation can reduce the visual information display amount of the second direction, differentiated display of the visual information of the two directions is realized, output of the visual information and processing data volume in the section direction can be reduced, and in scenes with low attention or demand quantity for the visual information of the second direction, the situation can save the resource required for processing the visual information of the second direction, and improve the actual use ratio of the resource.

In further optional situation, the pixels distributed along the first direction in the effective region with the changed shape is increased while the intervals of the pixels distributed along the second direction is reduced, thereby changing a ratio of the pixels distributed along the two directions in the effective region is changed. The situation can combine advantages of foregoing two situations and improve a practical use ratio of resource.

An optional situation further comprises that the quantities of the pixels distributed along the two directions in the effective region with the changed shape are both increased but different in increment, thereby leading to a change of a ratio of the pixels distributed along the two directions or, an optional situation further comprises that the quantities of the pixels distributed along the two directions in the effective region are both reduced but different in increment, thereby leading to a change of a ratio of the pixels distributed along the two directions, etc., thus realizing the differentiated display of the visual information of the two directions by changing the ratio of the pixels.

In the example embodiment of the present application, the inclining direction and/or inclining angle of at least two display units in the display system relative to the first direction can be same or different. The solution has a very flexible realizing manner to meet diversified practical application requirements.

Figure 5A:
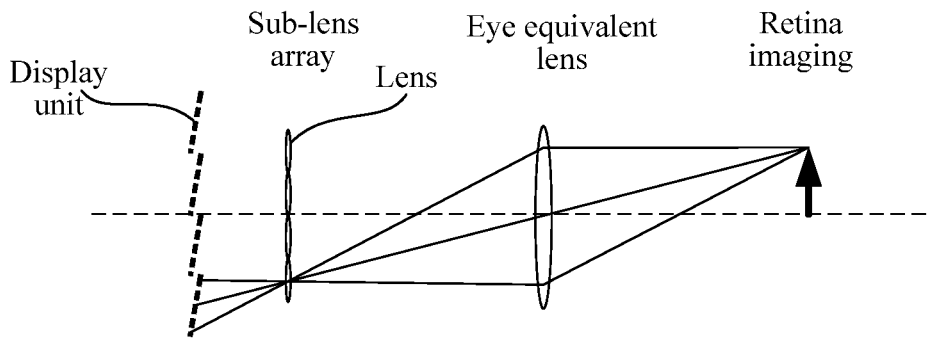
FIG. 5a is an illustration of one type of a plurality of inclined display units according to an example embodiment of the present application.

For example, the inclining direction and inclining angle of at least two display units in the display system relative to the first direction are same. As shown in FIG. 5a, in the light field display, the display units in the display array can be inclined by the same angle relative to the same direction of the first direction. The solution is simple to control and easy to realize, and is favorable for realizing differentiated visual information display of different direction of the at least two display units, and realizing unified control.

Figure 5B:
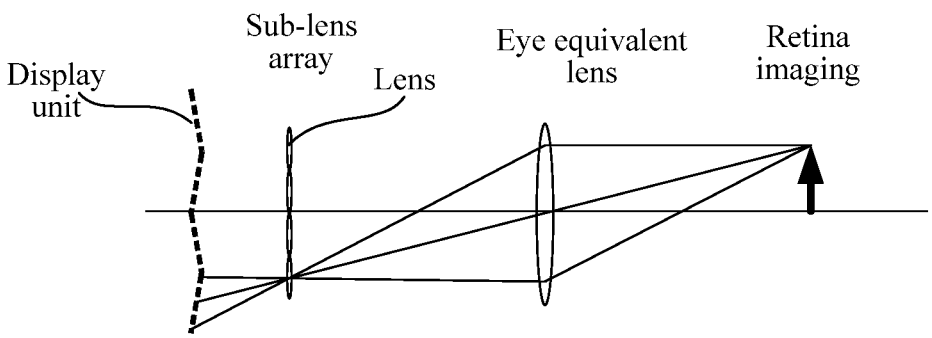
FIG. 5b is an illustration of another type of a plurality of inclined display units according to an example embodiment of the present application.
Figure 6A:
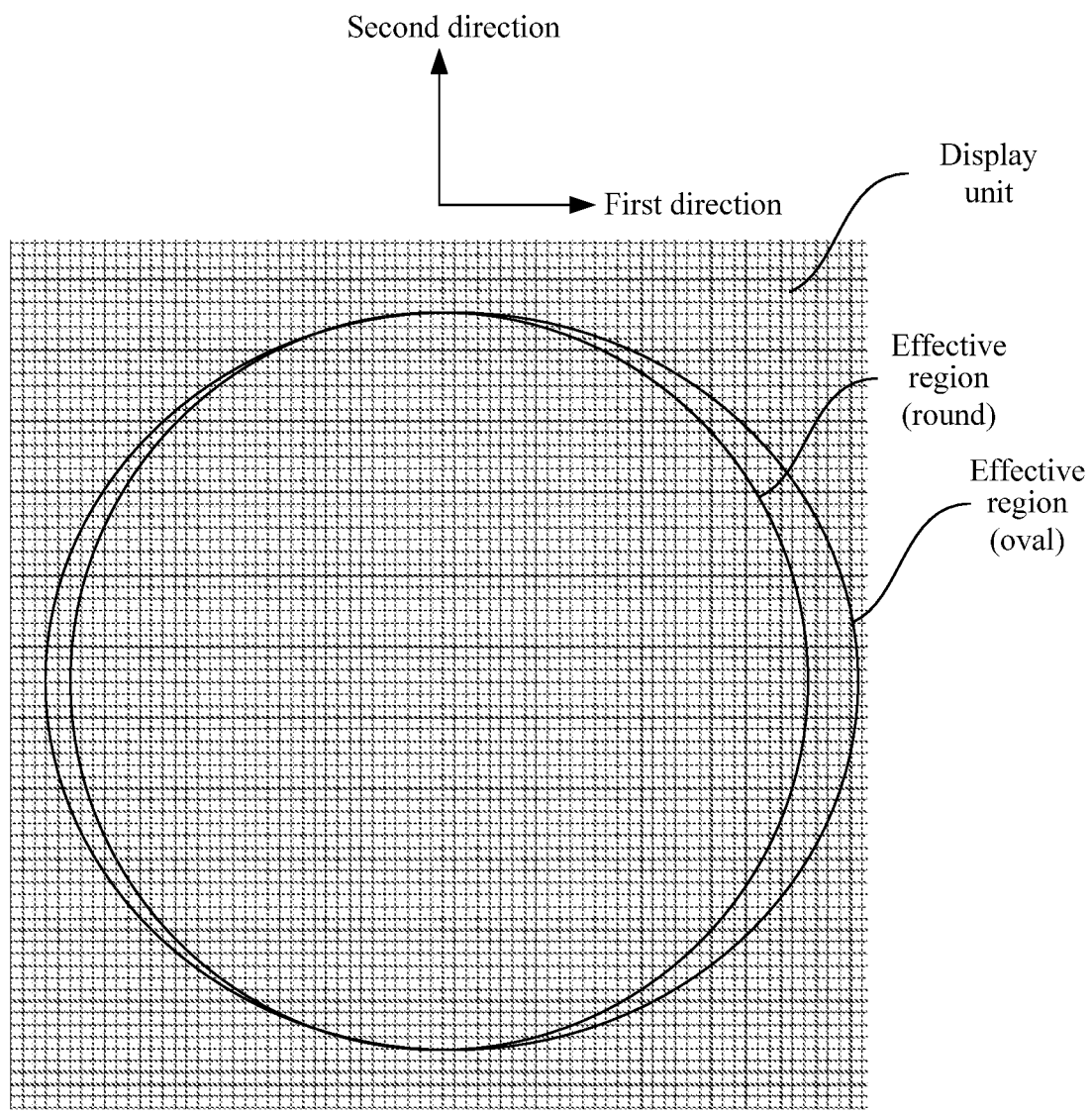
FIG. 6a is an illustration of an effective region before and after inclining of a display unit according to an example embodiment of the present application.

For another example, the at least two adjacent display units in the display system are inclined relative to first direction in the opposite direction but by the same inclining angle. As shown in FIG. 5b, in the light field display, two adjacent display units of the display array are one group, the adjacent two display units in the group are inclined by the same angle relative to the opposite direction of the first direction, for example, in the two adjacent display units A and B, one display unit A is clockwise inclined by an angle with the center thereof as a fulcrum relative to the first direction, the other display unit B is counterclockwise inclined by the same angle with the center thereof as a fulcrum relative to the first direction, the shape of each inclined effective region becomes an oval from an original round, as shown in FIG. 6a, the center of the oval is not coincided with the center of the round, certain deviation exists, the oval is in eccentric distribution relative to the center of the round, therefore, viewing from single display units, the quantity of pixels at one side of the center of the round and the quantity of the pixels at the other side of the round are not equal along the first direction in the oval effective region, and such asymmetric pixel distribution causes resolutions of image information of different visual angles displayed in the first direction to possibly have difference. Usually, objects to be displayed corresponding to two adjacent display units have small difference, in the solution, the at least two adjacent display units are symmetrically inclined to cause the changed oval effective regions of the two adjacent display units to be in symmetric eccentric distribution. Thereby viewing from the whole of the two adjacent display units, the pixels distributed along the first direction in the two effective regions are as uniform as possible, the resolutions of the different visual angle information of the first direction are mutually complemented, and it is favorable for obtaining more balanced resolutions of the different visual angle information of the first direction.

In a case of performing inclining control over the at least one display unit, the display unit is taken as fit to cause each display unit to be inclined relative to the initial normal thereof rather than taking the display array as fit to integrally incline the whole display array. The advantage of such processing is to improve control flexibility, in a situation that content to be displayed has certain depth distribution, each display unit is inclined relative to an initial normal thereof of the display unit, and it is favorable for causing an overlapping range of depths of field ranges of light field information displayed by each of different display units to have overlapping of certain extent.

Figure 5C:
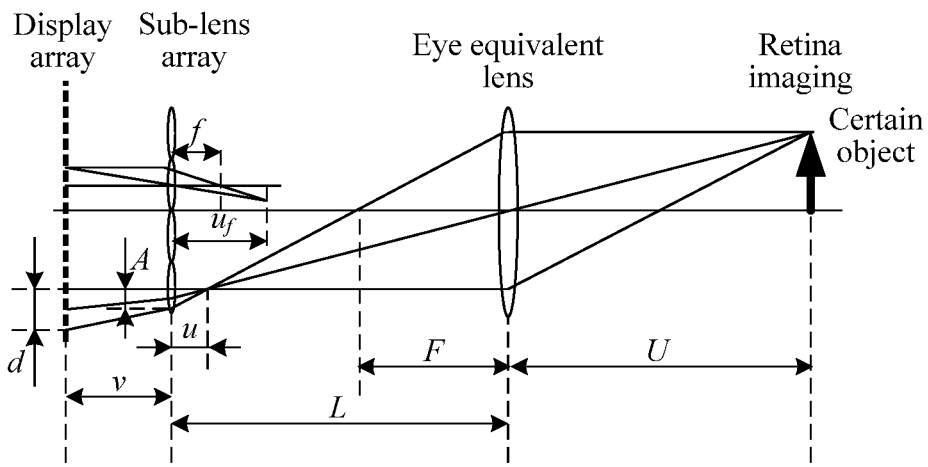
FIG. 5c is a light field display equivalent light path illustration according to an example embodiment of the present application.

One optional structure of the light field display is taken as an example for description, as shown in FIG. 5c, a light path graph of the light field display is equivalent to that the lens in the sub-lens array images a diffusion round of the display unit corresponding to the lens to be a first real image or a first virtual image, which then images to a second real image on retinas by eye equivalent lenses, therefore, the pixels in different positions on the display unit can display object information of different depths. The distance from the pixel position on the display unit to certain lens optical axis of the sub-lens array corresponds to a radius of the imaging diffusion round of the object information of different depths:

$$d = \frac{Afu_f}{u_f - f}\left(\frac{1}{u_f} - \frac{1}{u}\right) \quad (1)$$

wherein, A is the radius of one lens in the sub-lens array of the light field display, f is a focal length of one lens in the sub-lens array of the light field display, $u_f$ is the distance from a focusing plane of the one lens in the sub-lens array to the center of the lens, and u is the distance from one displayed real image or virtual image to the center of the corresponding lens in the sub-lens array (the distance is a positive value for the real image and is a negative value for the virtual image).

An imaging formula of the eye equivalent lens (regarded as a main lens) is:

$$\frac{1}{F} = \frac{1}{U} + \frac{1}{V} = \frac{1}{U} + \frac{1}{L-u} \quad (2)$$

wherein, U is the distance from the second real image to the main lens, F is a focal length of the main lens, and L is the distance from the optical center of the main lens to the optical center of the lens.

An imaging formula of certain lens in the sub-lens array:

$$\frac{1}{f} = \frac{1}{u_f} + \frac{1}{v} \quad (3)$$

Wherein, v is the distance from certain pixel of an effective region corresponding to the lens in the display unit to the lens.

According to formulas (1), (2) and (3), it can be obtained that:

$$\frac{1}{U} = \frac{1}{F} + \frac{1}{\frac{1}{\frac{1}{f} - \frac{1}{v}\left(1 + \frac{d}{A}\right)} - L} \quad (4)$$

It can be seen that when the display array or display unit is inclined, v from different pixels of the display array or display unit to the corresponding lens is changed and can be adjusted according to the foregoing formula to keep other parameters unchanged as much as possible. If the whole display array is inclined relative to the initial normal thereof, the difference of the v from different pixels of the display array or display unit to the corresponding lens is larger, which leads to that an overlapping range of depths of field ranges of light field information displayed by each of different display regions of the display array is oversmall or not overlapped, which possibly influences generation of a focusing image. In the example embodiment of the present application, each display unit in the at least one display unit is inclined relative to the initial normal of the display unit, control is flexible, and it is favorable for avoiding an overlarge distance between different pixels on the display array and the corresponding lenses on the plane of the sub-lens array, to cause a range of depths of field ranges of light field information displayed by each of different display units to have certain overlapping to certain extent, thereby further being favorable for generating and displaying a refocusing image.

Figure 6B:
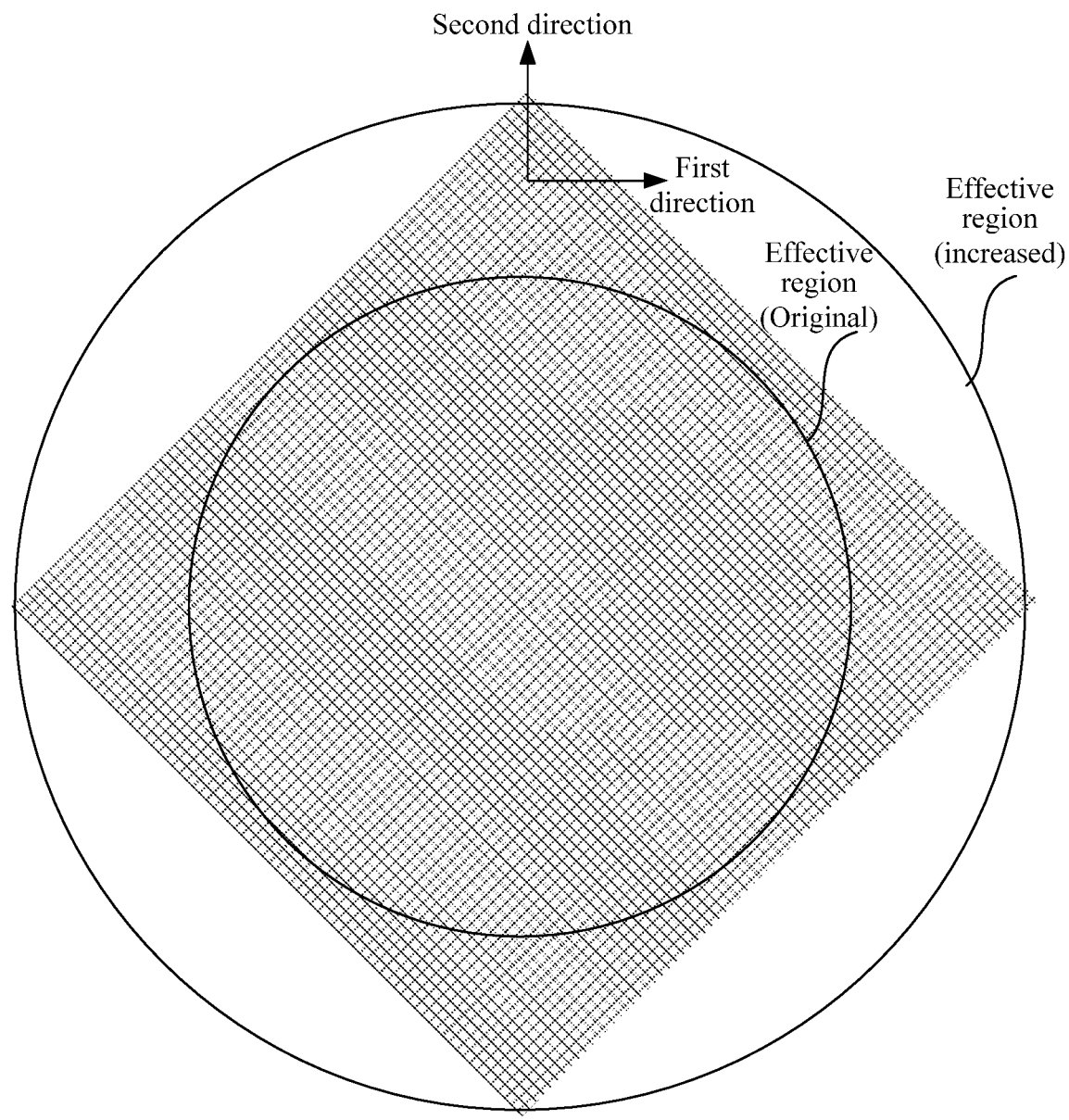
FIG. 6b is a rotating illustration of a display unit according to an example embodiment of the present application.

In the example embodiment of the present application, by inclining the display unit relative to the initial normal thereof, the shape and size of the effective region of the display unit can be changed while a practically changed pixel quantity of the effective region relates to the pixel quantity and relative positions of the display unit. Optionally, before the displaying the image to be shot by the display system, the method further comprises: causing the at least one display unit to rotate around a normal direction thereof to cause a maximal quantity of pixels allowing to be changed along the first direction of the at least one display unit to be increased. For example, as shown in FIG. 6b, the display unit is square, the display unit can be rotated by 45 degrees around a normal direction thereof to cause the quantity of the pixels distributed along the first direction to be increased, the quantity of the pixels allowing to be changed along the first direction in each effective region of the display unit is increased, thus being favorable for increasing a proportion of the pixels distributed along the first direction in the effective region among existing pixels of the display unit, further being favorable for increasing a proportion of the visual information of the first direction comprised in the content displayed by the display unit, realizing the differentiated display of the visual information of different directions, and improving a practical use ratio of the resource as much as possible. It should be indicated that the operation of rotating the display unit can be performed before the inclining of the display unit or after the inclining of the display unit, and a realizing manner is very flexible and is not limited by the embodiment of the present application.

Optionally, before the displaying the content by the changed display system, the method further comprises: increasing each effective region of the at least one display unit. The solution can cause more pixels of the display unit to participate in the content display and improve a practical use ratio of the pixels of the display unit; in addition, the processing of increasing the effective region of the display unit and the processing of inclining the display unit relative to the initial normal thereof and/or rotating the display unit around the normal thereof are combined to be favorable for increasing a controllable room of the quantity of the pixels distributed along the first direction and the second direction in the effective region, and it is more favorable for realizing differentiated visual information display of different directions.

Figure 7:
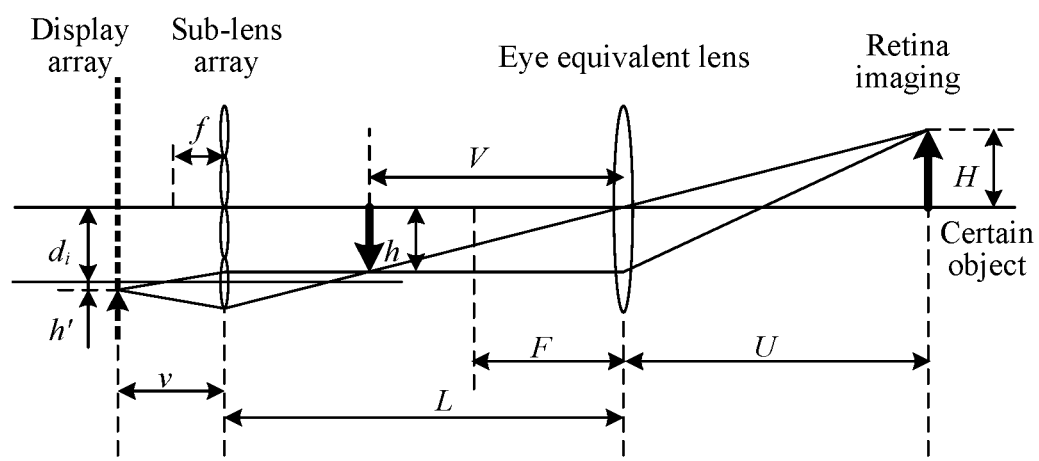
FIG. 7 is another light field display equivalent light path illustration according to an example embodiment of the present application.

The light field display is taken as an example, according to an optical imaging principle, the image formed on a retina of a user displayed when the user sees the image displayed by the display array through the sub-lens array corresponds to the image serving as the content to be displayed according to certain proportion, therefore, according to imaging information of the retinas, a corresponding relation between the equivalent image and the display region of the display unit can be derived, and with reference to FIG. 7, a following relational expression can be obtained according to an imaging formula and a triangular geometric relation:

$$\frac{1}{U} + \frac{1}{V} = \frac{1}{F} \quad (5)$$

$$\frac{1}{v} + \frac{1}{L-v} = \frac{1}{f} \quad (6)$$

$$\frac{H}{h} = \frac{U}{V} \quad (7)$$

$$\frac{h - d_i}{h' + d_i} = \frac{L - V}{v} \quad (8)$$

wherein, U, V and L, are respectively distances from an eye ball lens to the retina, to displayed image and to the sub-lens array, F and f are respectively focal lengths of an eye ball and the sub-lens, v is a distance from the sub-lens to the pixel of the display unit, H, h, and h' are image surfaces of certain object virtualized on the retina and the image size of the ith sub-lens on the corresponding imaging region, $d_i$ is a distance between the ith sub-lens and a reference point, the reference point can be any point of the image of the content to be displayed, the reference point takes a crossing point between an optical axis of the eye ball and the display unit as an example for simplifying calculation, and it can be obtained according to the formulas (5)-(8), $$h' = \frac{f(d_i U - LH)}{U(v - f)} + \frac{H}{Uv} \quad (9)$$

For any imaging point on the retina (assuming that the distance from the point to the optical center of the eye ball lens is H, the point equivalently corresponds to certain equivalent point of the image to be displayed, and H is equivalent to relative position information of the relative equivalent image to be displayed of the corresponding point and the reference point corresponding to the optical center of the eye ball lens), h' of the ith sub-lens on the corresponding imaging region can be calculated, that is, an imaging point position thereof on the corresponding imaging region of the ith sub-lens can be obtained by mapping. Therefore, according to the formula (9), when other parameters are kept unchanged, by adjusting v and f, and h' can be adjusted while the formula (5) is established. That is to say, parameters such as a focal length and curvature of the lens and/or the distance between the lens and the display unit can be reasonably adjusted to cause the h' of the ith sub-lens on the corresponding imaging region to be increased, h' reflects the size of the effective region, and when the h' is increased, the effective region of the display unit is also increased.

Specifically, optical parameters of the lens corresponding to the at least one display unit can be adjusted to increase each effective region of the at least one display unit, and the optical parameters of the lens comprise but are not limited to parameters such as a focal length and curvature of the lens. And/or, the position of the lens is moved, for example, the lens corresponding to the at least one display unit is moved along an optical axis direction thereof to increase each effective region of the at least one display unit. And/or, the at least one display unit can be translated along the initial normal direction thereof to increase each effective region of the at least one display unit. By any foregoing method, each effective region of the at least one display unit is increased, thus, light emitted from more pixels in each display unit of the at least one display unit can be transmitted to a visual angle range of the display system by the lens and enters eyes of the user to image, thereby improving a practical use ratio of the pixels of each display unit. In addition, by matching a solution of adjusting the pixel distribution of the corresponding display unit and/or rotating the display unit around the normal direction thereof, the practical use ratio of the pixels of the corresponding display unit can be further improved, more controllable room is provided for changing the ratio of the pixels distributed along the two directions of the display unit, and it is more favorable for realizing differentiated visual information display of different directions. It needs to be indicated that the operation of the increasing the effective region of the display unit can be performed before the operation of rotating the display unit and/or inclining the display unit, and can also be performed after the operation of rotating the display unit and/or inclining the display unit, a realizing manner is very flexible and is not limited by the embodiment of the present application.

Further, in combination with any display control method according to the embodiment of the present application, optionally, before inclining the at least one display unit relative to the initial normal thereof, the method further comprises: determining the first direction. For certain display unit, the first direction and the second direction are flexibly determined under a relation of being respectively vertical to the initial normal of the display unit and mutually orthogonal, that is, the first direction and the second direction are flexibly determined under a relation of being in a plane parallel with the non-inclined display unit and mutually orthogonal, and are not limited by the present application. After the first direction is determined, according to a mutual relation between the first direction and the second direction, the second direction can be determined, and differentiated visual angle information display in the first direction and the second direction is realized. In the solution, a visual angle information display direction to be enhanced or weakened can be determined according to practical requirements, and a realizing manner is very flexible and can meet diversified practical application requirements.

Optionally, determining the first direction comprises: determining a horizontal direction vertical to the initial normal of the display unit as the first direction; and correspondingly, the vertical direction vertical to the initial normal of the display unit is the second direction. In the solution, the horizontal direction vertical to the initial normal of the display unit serves as the first direction of visual angle information display to be enhanced or weakened. Research indicates that eyes (left eye and right eye) are in horizontal distribution, causing to certain extent that the eyes are more sensitive to visual angle information in the horizontal direction and are less sensitive to the visual angle information in the vertical direction, leading to that in a content display process, visual information in the horizontal direction and the vertical direction have different visual influences on the eyes in a scene application such as light field reconfiguration. Usually, attention or demand quantity on the visual information in the horizontal direction is larger than that on the visual information in the vertical direction, the horizontal direction parallel with the display unit serves as the first direction, the vertical direction parallel with the display unit serves as the second direction, thus realizing differentiated display of the visual information of different directions of the display unit, the proportion of the visual information of the first direction (horizontal direction) is increased in the image information displayed by the display unit, and/or, the proportion of the visual information of the second direction (vertical direction) is reduced in the image information displayed by the display unit, thereby improving a practical use ratio of resource, and better meeting diversified practical application requirements.

Optionally, determining the first direction comprises: determining a vertical direction vertical to the initial normal direction of the display unit as the first direction; and correspondingly, the horizontal direction vertical to the initial normal direction of the display unit is the second direction. In the solution, the vertical direction vertical to the initial normal direction of the display unit serves as the first direction of the visual angle information to be enhanced or weakened, thereby meeting the practical application requirements of displaying the visual angle information needing to be enhanced or weakened in the vertical direction vertical to the normal direction of the display unit.

Optionally, determining the first direction comprises: determining the first direction according to a size of the display system. The size of the display system can be denoted by a transverse length and/or longitudinal length of the display array of the display system. The inventor of the present application finds in a process of practicing the embodiment of the present application that in some cases, the size of the display system may influence a viewing behavior of the user for the display content. For example, a light field reconfigured by the display system presents certain stereoscopic distribution in space, the user can see different visual angle information distributed along the horizontal direction by moving head left and right, for example, see a left view or a right view of certain object; the user can see different visual angle information distributed along the vertical direction by moving the head up and down, for example, see, a top view or a bottom view of certain object. If the longitudinal height of the display system is higher, a probability that the user moves the head to view up and down is lower and a manner that the user moves the head left and right to see different visual angle information is more natural, therefore, the horizontal direction vertical to the initial normal of the display unit is determined as the first direction, the visual angle information of the first direction is enhanced and displayed to improve an angle resolution of the horizontal direction; the visual angle information in the vertical direction vertical to the initial normal of the display unit can be weakened and displayed to reduce the data processing volume required by the visual angle information of the vertical direction that the user pays less attention or is less sensitive. In the solution, the direction of the visual angle information display to be enhanced or weakened is determined according to the size of the display system, and it is favorable for meeting diversified practical application requirements.

Optionally, determining the first direction comprises: determining the first direction according to moving information of the display system. The inventor of the present application finds in a process of practicing the embodiment of the present application that the moving information of the display system is related to aspects of a viewing habit, operation and a man-machine interaction manner of the user to some extent. For example, in some game operations, the operation of inclining the display systems such as a smart phone by the user may be involved to realize man-machine interactive control, etc., therefore, the direction of the visual angle information display to be enhanced or weakened can be determined according to the moving information of the display system to cause the practically displayed visual angle information of the more attended, important or sensitive direction to be richer to improve the angle resolution. Further optionally, determining the first direction according to the moving information of the display system comprises: determining a reference direction corresponding to the moving information of the display system as the first direction according to a mapping relation between the moving information of the display system and the reference direction. The reference direction corresponding to the moving information and inclined relative to the horizontal direction of the display system is determined as the horizontal direction, and the reference direction corresponding to the moving information and inclined relative to the vertical direction of the display system is determined as the vertical direction. Thus, in practical application, current moving information of the display system can be obtained by but not limited to parts such as a gravity sensor, and the direction corresponding to the current moving information of the display system is determined as the first direction, the visual angle information in the first direction is enhanced and displayed to improve an angle resolution of the first direction; the visual angle information in the second direction can be weakened and displayed to reduce the data processing volume required by the visual angle information of the vertical direction that the user pays less attention or is less sensitive.

After a ratio of the pixels distributed along the two directions of the at least one display unit of the display system is changed by adopting the example embodiment of the present application, according to practical requirements, a flexible display control technology can be determined for content display control according to the display system with the changed pixel ratio to improve a display effect and user experience, and the embodiment of the present application does not limit a specific display control technology according to the display system with the changed pixel ratio. For example, a manner of inclining each display unit relative to the initial normal thereof of the light field display is adopted to change a ratio of pixels distributed along the first direction and the second direction in each effective display region of the display unit, after such change, distances from different pixels of the display unit to corresponding lenses of the display units are different, therefore, in a traditional light field processing technology for content display, fixed distances between each pixel of the display array and the lens of the sub-lens array is replaced with the actual distance from each pixel of each display unit to the corresponding lens, so as to preprocess the light field display content, light field display is performed based on the preprocessed light field content, thereby realizing the differentiated display of different visual angle information of the first direction and the second direction.

It should be understood by a person skilled in the art that in various embodiments of the present application, the value of the serial number of each step described foregoing does not mean an execution sequence, and the execution sequence of each step should be determined according to the function and internal logic thereof, and should not be any limitation on the implementation procedure of the embodiments of the present application.

Figure 8:
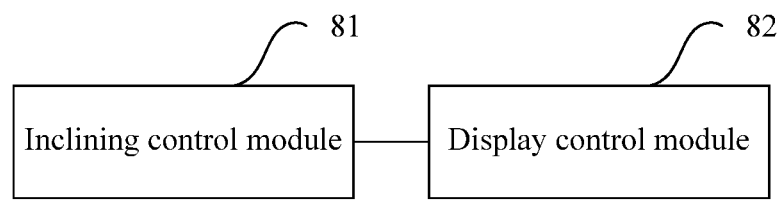
FIG. 8 is a logic block diagram of a first display control apparatus according to an example embodiment of the present application.

FIG. 8 is a logic block diagram of a first display control apparatus according to an embodiment of the present application. As shown in FIG. 8, the display apparatus according to the embodiment of the present application can comprise: an inclining control module 81 and a display control module 82.

The inclining control module 81 is configured to incline at least one display unit relative to an initial normal thereof to change a ratio of pixels distributed along two directions in each effective display region of the at least one display unit of a display system, wherein light emitted by each pixel in the effective display region of each display unit in the at least one display unit is transmitted to a visual angle range by a lens corresponding to the display unit in the display system, and the two directions comprise a first direction and a second direction parallel with the display unit and orthogonal with each other.

The display control module 82 is configured to display a content to be displayed by the changed display system.

According to one or more example embodiments of the present application, a manner of inclining at least one display unit relative to an initial normal thereof is adopted to change a ratio of pixels distributed along the first direction and the second direction in each effective display region of at least one display unit, to cause that in each effective display region of the at least one display unit, a quantity of pixels distributed along the first direction and a quantity of pixels distributed along the second direction are different, a pixel ratio of the two is not equal to 1, thus, by using the display system with the at least one inclined display unit for content display, a proportion of practically displayed parallax information of the at least one display unit respectively displayed in the first direction and the second direction is changed, and differentiated display of the visual angle information in different directions is realized to cause the practically displayed content to present differentiated angle resolutions of different directions, thereby better meeting diversified practical application requirements.

A device representing manner of the display control apparatus is not limited, for example, the display control apparatus can be some or one independent part, which matches and communicates with a display system comprising display unit; or the display control apparatus can be integrated in the display system comprising the display unit as certain function module.

Optionally, the display system comprises a light field display, the light field display comprises a display array and a sub-lens array, which are arranged in sequence, the sub-lens array comprises a plurality of lens in array distribution, the display array comprises a plurality of display units in array distribution. Optionally, in a realizing manner for content display by the light field display, the multidirectional visual angle information of at least one object in the content is respectively displayed by the pixels of the one of the at least one display unit, or the multidirectional visual angle information of at least one object in the content is respectively displayed by at least two of the at least one display unit. In the solution, by changing a ratio of the pixels along two orthogonal directions of the at least one display unit of the light field display, a proportion of respectively practically displayed parallax information of the at least one display unit in the first direction and the second direction can be changed, and differentiated display of the visual angle information in different directions is realized to cause the practically displayed content to present differentiated angle resolutions in different directions, thereby better meeting diversified practical application requirements.

Optionally, the display system comprises a display array, the display array comprises a plurality of displays in array distribution, and the display comprises one display unit and one lens arranged in sequence. Optionally, in a realizing manner of for content display based on the display array, the multidirectional visual angle information of at least one object in the content is transmitted the lenses. In the solution, by changing the pixel ratio of each of the display units of the display array along two orthogonal directions, a proportion of respectively practically displayed parallax information of the display units in the first direction and the second direction can be changed, and differentiated display of the multidirectional visual angle information in different directions is realized to cause the practically displayed content to present differentiated angle resolutions of different directions, thereby better meeting diversified practical application requirements.

Figure 9:
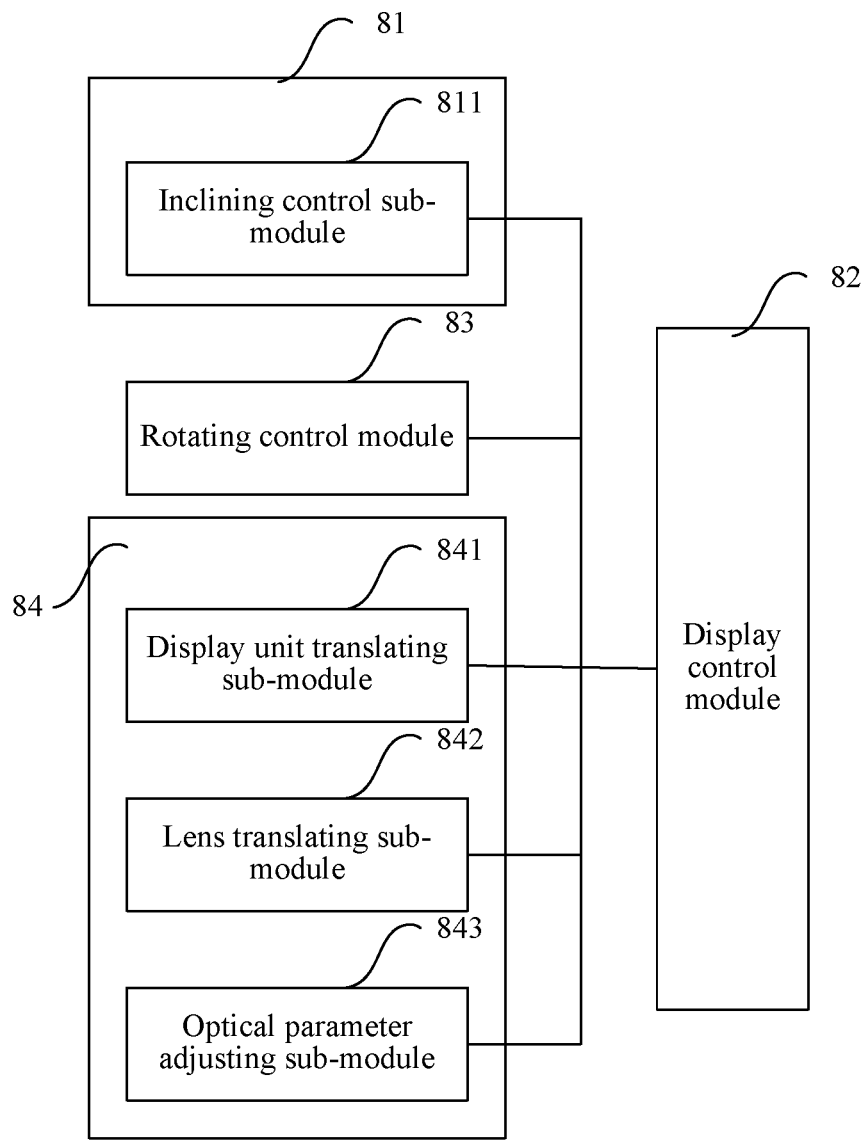
FIG. 9 is a logic block diagram of a second display control apparatus according to an example embodiment of the present application.

Optionally, as shown in FIG. 9, the inclining control module 81 comprises: an inclining control sub-module 811. The inclining control sub-module 811 is configured to incline the at least one display unit by an angle relative to the first direction to change the shape of each effective region of the at least one display unit, thereby increasing the quantity of the pixels distributed along the first direction in each effective region of the at least one display unit. In the situation, the effective region with the changed shape of the display unit is an oval of which the long axis is parallel with the first direction, and the quantity of the pixels distributed along the first direction in the effective region is more than the quantity of the pixels distributed along the second direction in the effective region.

Optionally, the inclining direction and/or inclining angle of at least two display units in the display system relative to the first direction can be same or different. The solution has a very flexible realizing manner to meet diversified practical application requirements.

For example, the inclining direction and inclining angle of at least two display units in the display system relative to the first direction are same. The solution is simple to control and easy to realize, and is favorable for realizing differentiated visual information display of different direction of the at least two display units, and realizing unified control.

For another example, the at least two display units in the display system are inclined relative to first direction in the opposite direction but by the same inclining angle. The solution symmetrically inclines the at least two adjacent display units, causing the changed oval effective regions of the at least two adjacent display units to be in symmetric eccentric distribution, thereby viewing from the whole of the two adjacent display units, the pixels distributed along the first direction in the two effective regions are as uniform as possible, the resolutions of the different visual angle information of the first direction are mutually complemented, and it is favorable for obtaining more balanced resolutions of the different visual angle information of the first direction.

Optionally, the display control apparatus further comprises a rotating control module 83. The rotating control module 83 is configured to cause the at least one display unit to rotate around a normal direction thereof to cause a maximal quantity of pixels allowing to be changed along the first direction in the effective region of the at least one display unit to be increased. The solution causes the quantity of the pixels allowing to be changed along the first direction in the effective region of the rotated display unit to be increased compared with that of the display unit before rotating, thereby being favorable for increasing the proportion of the pixels distributed along the first direction in the effective region among existing pixels of the display unit, being favorable for increasing a proportion of the visual information of the first direction comprised in the content displayed by the display unit, realizing the differentiated display of the visual information of different directions, and improving a practical use ratio of the resource as much as possible.

Optionally, the display control apparatus further comprises an effective region increasing module 84. The effective region increasing module 84 is configured to increase each effective region of the at least one display unit.

Optionally, the effective region increasing module 84 comprises a display unit translating sub-module 841. The display unit translating sub-module 841 is configured to translate the at least one display unit along the normal direction thereof to increase each effective region of the at least one display unit. The solution moves the at least one display unit along the corresponding initial normal direction thereof to increase each effective region of the at least one display unit.

Optionally, the effective region increasing module 84 comprises a lens translating sub-module 842. The lens translating sub-module 842 is configured to translate the at least one lens along each optical axis direction of the at least one lens corresponding to the at least one display unit to increase each effective region of the at least one display unit. The solution moves the lens corresponding to the at least one display unit along the optical axis thereof to increase each effective region of the at least one display unit.

Optionally, the effective region increasing module 84 comprises an optical parameter adjusting sub-module 843. The optical parameter adjusting sub-module 843 is configured to adjust optical parameters of each of the at least one lens respectively corresponding to the at least one display unit to increase each effective region of the at least one display unit. The optical parameters of the lens comprise but are not limited to parameters such as a focal length and curvature of the lens. The solution can increase each effective region of the at least one display unit by adjusting the optical parameters of the lens corresponding to the at least one display unit.

Figure 10:
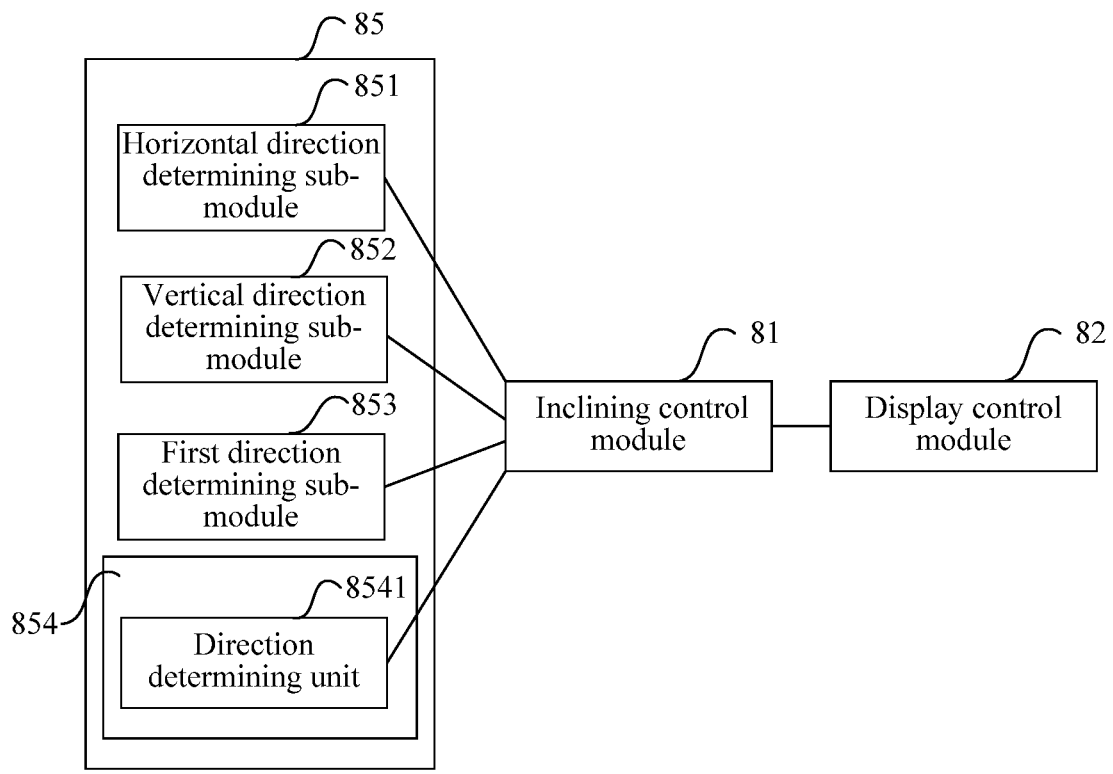
FIG. 10 is a logic block diagram of a third display control apparatus according to an example embodiment of the present application.

Optionally, as shown in FIG. 10, the display control apparatus further comprises: a direction determining module 85. The direction determining module 85 is configured to determine the first direction. In the solution, a visual angle information display direction to be enhanced or weakened can be determined according to practical requirements, and a realizing manner is very flexible and can meet diversified practical application requirements.

Optionally, the direction determining module 85 comprises a horizontal direction determining sub-module 851, configured to determine a horizontal direction vertical to the initial normal of the display unit as the first direction. In the solution, the horizontal direction vertical to the initial normal of the display unit serves as the first direction of visual angle information display to be enhanced or weakened, thereby meeting the practical application requirements of display of the visual angle information required to be enhanced or weakened of the direction.

Optionally, the direction determining module 85 comprises a vertical direction determining sub-module 852. The vertical direction determining sub-module 852 is configured to determine a vertical direction vertical to the initial normal of the display unit as the first direction. In the solution, the vertical direction vertical to the initial normal of the display unit serves as the first direction of visual angle information display to be enhanced or weakened, thereby meeting the practical application requirements of display of the visual angle information needing to be enhanced or weakened of the direction.

Optionally, the direction determining module 85 comprises a first direction determining sub-module 853. The first direction determining sub-module 853 is configured to determine the first direction according to the size of the display system. In the solution, the direction of the visual angle information display to be enhanced or weakened is determined according to the size of the display system, and it is favorable for meeting diversified practical application requirements.

Optionally, the direction determining module 85 comprises a moving direction determining sub-module 854. The moving direction determining sub-module 854 is configured to determine the first direction according to moving information of the display system. In the solution, the direction of the visual angle information display to be enhanced or weakened can be determined according to the moving information of the display system to cause the practically displayed visual angle information of the more attended, important or sensitive direction to be richer to improve the angle resolution.

Further optionally, the moving direction determining sub-module 854 comprises a direction determining unit 8541. The direction determining unit 8541 is configured to determine a reference direction corresponding to the moving information of the display system as the first direction according to a mapping relation between the moving information of the display system and the reference direction. In the solution, the direction corresponding to current moving information of the display system is determined as the first direction, the visual angle information of the first direction is enhanced and displayed to improve an angle resolution of the horizontal direction; the visual angle information in the second direction can be weakened and displayed to reduce the data processing volume required by the visual angle information of the vertical direction that the user pays less attention or is less sensitive.

Figure 11:
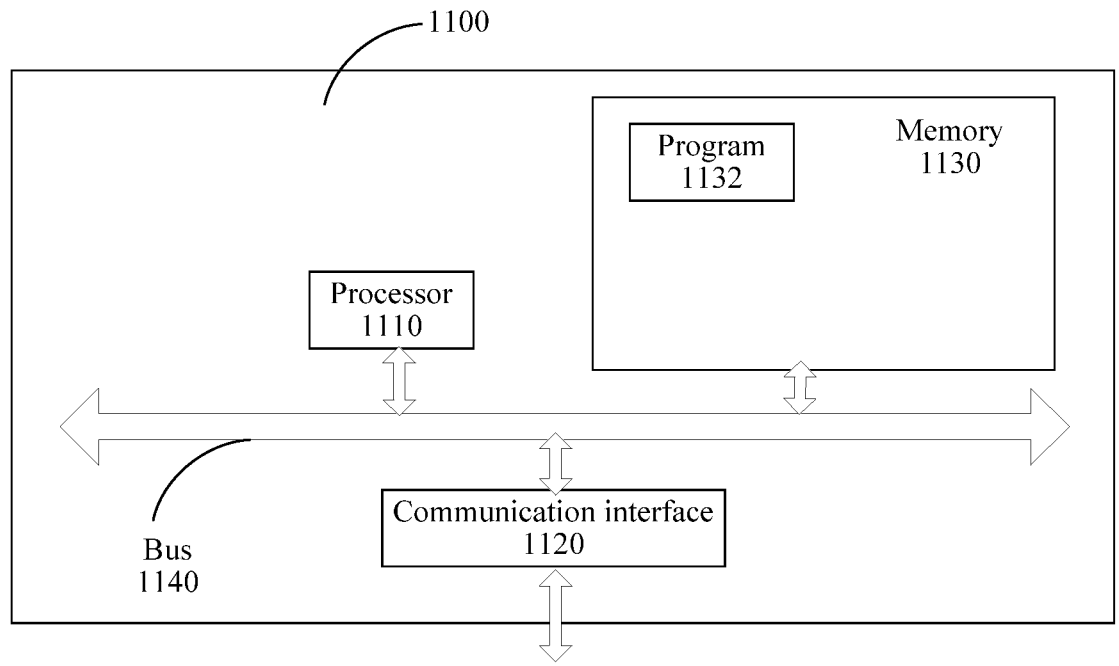
FIG. 11 is a logic block diagram of a fourth display control apparatus according to an example embodiment of the present application.

FIG. 11 is a logic block diagram of a fifth display control apparatus according to an embodiment of the present application. The embodiment of the present application does not limit a specific realizing manner of the display control apparatus 1100. As shown in FIG. 11, the display control apparatus 1100 can comprise:

a processor 1110, a communication interface 1120, a memory 1130 and a communication bus 1140;

the processor 1110, the communication interface 1120 and the memory 1130 finish mutual communication by the communication bus 1140.

The communication interface 1120 is configured to communicate with a device with a communicating function, an external light source and the like.

The processor 1110 is configured to execute a program 1132, and specifically execute related steps in the embodiments of any display control method.

For example, the program 1132 can comprise a program code, and the program code comprises a computer operation command.

The processor 1110 can be a central processing unit (CPU), or an application specific integrated circuit (ASIC), or may be configured as one or more integrated circuits that implement the embodiments of the present application.

The memory 1130 is configured to store the program 1132. The memory 1130 can comprise a high speed random access memory (RAM), and can also comprise a non-volatile memory such as at least one magnetic disk memory.

For example, in one optional realizing manner, the processor 1110 can execute the following steps by executing the program 1132: inclining at least one display unit relative to an initial normal thereof to change a ratio of pixels distributed along two directions in each effective display region of the at least one display unit of a display system, wherein light emitted by each pixel in the effective display region of each display unit in the at least one display unit is transmitted to a visual angle range by a lens corresponding to the display unit in the display system, and the two directions comprise a first direction and a second direction parallel with the display unit and orthogonal with each other; and displaying a content to be displayed by the changed display system.

In other optional realizing manners, the processor 1110 can execute the steps mentioned in any foregoing embodiment by executing the program 1132 which is not repeated herein.

For the implementation of steps in the program 1132 refers to the corresponding descriptions of corresponding steps, modules, sub-modules and units in the foregoing embodiments, which are not repeated herein. It may be clearly understood by a person skilled in the art that, for the purpose of convenient and brief description, reference may be made to the description of corresponding procedures in the foregoing method embodiments for detailed working procedures of the foregoing devices and modules, and details are not repeated herein.

In forgoing embodiments of the present application, serial numbers and/or sequence of the embodiments are merely for the purpose of description and are not representative of good and poor embodiments. Description on each embodiment has an emphasis, and the part not described in detail in certain embodiment can refer to related description of other embodiments. Related description of the implementing principles or processes of the apparatus, device or system embodiments can refer to recording of corresponding embodiments and is repeated herein.

It can be appreciated by a person of ordinary skill in the art that, exemplary units and method steps described with reference to the embodiments disclosed in this specification can be implemented by electronic hardware or a combination of computer software and electronic hardware. Whether these functions are executed by hardware or software depends on specific applications and design constraints of the technical solution. A person skilled in the art may use different methods to implement the described functions for each specific application, but such implementation should not be construed as a departure from the scope of the present application.

If the function is implemented in the form of a software functional unit and is sold or used as an independent product, the product can be stored in a computer-readable storage medium. Based on this understanding, the technical solution of the present application essentially, or the part that contributes to the prior art, or a part of the technical solution may be embodied in the form of a software product; the computer software product is stored in a storage medium and comprises several instructions for enabling a computer device (which may be a personal computer, a server, a network device, or the like) to execute all or some of the steps of the method in the embodiments of the present application. The foregoing storage medium comprises a USB flash drive, a removable hard disk, a read-only memory (ROM), a random access memory (RAM), a diskette or a compact disk that can be used for storing a program code.

In the apparatus, method and system embodiments of the present application, obviously, each part (system, subsystem, module, sub-module, unit, subunit and the like) or each step can be decomposed, combined and/or recombined after being decomposed. These decomposition and/or recombination should be regarded as equivalent solutions of the present application. Meanwhile, in the forgoing description of specific embodiments, the characteristics described and/or shown aiming at one embodiment can be used in one or more other embodiments in a same or similar manner, can be combined with the characteristics in other embodiments or replace the characteristics in other embodiments.

It should be emphasized that the terms "comprising/containing" denote existence of characteristics, elements, steps or components when used in the specification, but do not exclude existence or addition of one or more other characteristics, elements, steps or components.

Finally, it should be indicated that the above embodiments are only used to describe the present application, rather than limit the present application; various alterations and variants can be made by those of ordinary skill in the art without departing from the spirit and scope of the present application, so all equivalent embodiments also belong to the scope of the present application, and the scope of patent protection of the present application should be defined by claims.

What is claimed is:

1. A method, comprising:
inclining, by a system comprising a processor, at least one display unit relative to an initial normal of the at least one display unit to change a ratio of pixels distributed along a first direction and a second direction in each effective display region of the at least one display unit of a display system resulting in a changed display system, to adapt to sensitivities of human eyes to visual information in the first direction and the second direction, wherein each of the at least one display units corresponds to a lens, wherein light emitted by each pixel in each effective display region of each display unit in the at least one display unit is transmitted according to a visual angle range by each lens corresponding to each display unit in the display system, and the first direction and the second direction are parallel with the at least one display unit and orthogonal with each other;

increasing each effective display region of the at least one display unit; and displaying content to be displayed by the changed display system, wherein the changed display system comprises a light field display, wherein the light field display comprises a display array and a sub-lens array arranged in sequence, wherein the sub-lens array comprises a plurality of lenses in a first array distribution, and wherein the display array comprises a plurality of display units in a second array distribution, and wherein a focal length of an array lens of the plurality of lenses is adjusted;

wherein the inclining comprises:

symmetrically inclining adjacent display units, with respect to the initial normal, by a same angle and opposite in inclining direction, so as to change shapes of effective display regions of the adjacent display units, and wherein an effective display region with a changed shape is an oval, a short axis of the oval is parallel with the first direction, and the changed shape effective display regions of the adjacent display units are in symmetric eccentric distribution.

2. The method of claim 1, wherein a distance between the array lens and a corresponding display unit of the at least one display units is adjusted.

3. The method of claim 1, wherein multifunctional visual angle information of at least one object in the content is respectively displayed by a plurality of pixels of one display unit of the at least one display unit.

4. The method of claim 1, wherein multifunctional visual angle information of at least one object in the content is respectively displayed by at least two display units of the at least one display unit.

5. The method of claim 1, wherein the display array comprises a plurality of displays in array distribution, and wherein a display of the plurality of displays comprises a display unit of the at least one display unit, and a lens arranged in sequence.

6. The method of claim 5, wherein multifunctional visual angle information of at least one object in the content is respectively displayed by a plurality of lenses.

7. The method of claim 1, wherein at least one of an inclining direction or an inclining angle of at least two display units in the display system relative to the first direction are different.

8. The method of claim 1, wherein at least one of an inclining direction or an inclining angle of at least two display units in the display system relative to the first direction are same.

9. The method of claim 1, further comprising:

before the displaying the content to be displayed by the changed display system, rotating the at least one display unit around a normal of the at least one display unit to increase a maximal quantity of pixels allowed to be changed along the first direction in each effective display region of the at least one display unit.

10. The method of claim 1, wherein the increasing each effective display region of the at least one display unit comprises:

translating the at least one display unit along an initial normal direction of each display unit of the at least one display unit to increase each effective display region of the at least one display unit.

11. The method of claim 1, wherein the increasing each effective display region of the at least one display unit comprises:

respectively moving at least one lens along an optical axis direction of the at least one lens corresponding to the at least one display unit to increase each effective display region of the at least one display unit.

12. The method of claim 1, wherein the increasing each effective display region of the at least one display unit comprises:

adjusting an optical parameter of at least one lens respectively corresponding to the at least one display unit to increase each effective display region of the at least one display unit.

13. The method of claim 1, further comprising: before the inclining the at least one display unit relative to the initial normal, determining the first direction.

14. The method of claim 13, wherein the determining the first direction comprises:

determining a horizontal direction vertical to the initial normal of the at least one display unit as the first direction.

15. The method of claim 13, wherein the determining the first direction comprises:

determining a vertical direction vertical to the initial normal of the at least one display unit as the first direction.

16. The method of claim 13, wherein the determining the first direction comprises:

determining the first direction according to a size of the display system.

17. The method of claim 13, wherein the determining the first direction comprises:

determining the first direction according to moving information of the display system.

18. The method of claim 17, wherein the determining the first direction according to the moving information of the display system comprises:

determining a reference direction corresponding to the moving information of the display system as the first direction according to a mapping relation between the moving information of the display system and the reference direction.

19. An apparatus, comprising:

a memory that stores executable modules; and a processor, coupled to the memory, that executes or facilitates execution of the executable modules, the executable modules comprising:

an inclining control module configured to incline at least one display unit relative to an initial normal thereof to change a ratio of pixels distributed along a first direction and a second direction in each effective display region of the at least one display unit of a display system resulting in a changed display system, to adapt to sensitivities of human eyes to visual information in the first direction and the second direction, wherein light emitted by each pixel in each effective display region of each display unit in the at least one display unit is transmitted to a visual angle range by a lens corresponding to a display unit of the at least one display unit in the display system, and the first direction and the second direction are parallel with the at least one display unit and orthogonal with each other, wherein the inclining control module is further configured to symmetrically incline adjacent display units, with respect to the initial normal, by a same angle and opposite in inclining direction, so as to change shapes of effective display regions of the adjacent display units, and wherein an effective display region with a changed shape is an oval, a short axis of the oval is parallel with the first direction, and the changed shape effective display regions of the adjacent display units are in symmetric eccentric distribution;

an effective display region increasing module configured to increase each effective display region of the at least one display unit; and a display control module configured to display content to be displayed by the changed display system, wherein the display system comprises a light field display, wherein the light field display comprises a display array and a sub-lens array arranged in sequence, wherein the sub-lens array comprises a plurality of lenses in a first array distribution, and wherein the display array comprises a plurality of display units in a second array distribution, and wherein a distance between an array lens of the sub-lens array and the display unit is adjusted.

20. The apparatus of claim 19, wherein a focal length of the array lens is adjusted.

21. The apparatus of claim 19, wherein multifunctional visual angle information of at least one object in the content is respectively displayed by a plurality of pixels of the display unit.

22. The apparatus of claim 19, wherein multifunctional visual angle information of at least one object in the content is respectively displayed by at least two display units of the at least one display unit.

23. The apparatus of claim 19, wherein the display array comprises a plurality of displays in array distribution, and a display of the plurality of displays comprises the display unit and the lens arranged in sequence.

24. The apparatus of claim 23, wherein multifunctional visual angle information of at least one object in the content is respectively displayed by a plurality of lenses.

25. The apparatus of claim 19, wherein at least one of an inclining direction or an inclining angle of at least two display units in the display system relative to the first direction are different.

26. The apparatus of claim 19, wherein at least one of an inclining direction or an inclining angle of at least two display units in the display system relative to the first direction are same.

27. The apparatus of claim 19, wherein the executable modules further comprise:
a rotating control module configured to cause the at least one display unit to rotate around a normal direction of the at least one display unit to cause a maximal quantity of pixels able to be changed along the first direction in an effective display region of the at least one display unit to be increased.

28. The apparatus of claim 19, wherein the effective display region increasing module comprises:

a display unit translating sub-module configured to translate the at least one display unit along an initial normal direction of the at least one display unit to increase each effective display region of the at least one display unit.

29. The apparatus of claim 19, wherein the effective display region increasing module comprises:
a lens translating sub-module configured to translate at least one lens along each optical axis direction of the at least one lens corresponding to the at least one display unit to increase each effective display region of the at least one display unit.

30. The apparatus of claim 19, wherein the effective display region increasing module comprises:
an optical parameter adjusting sub-module configured to adjust optical parameters of each of at least one lens respectively corresponding to the at least one display unit to increase each effective display region of the at least one display unit.

31. The apparatus of claim 19, wherein the executable modules further comprise:
a direction determining module configured to determine the first direction.

32. The apparatus of claim 31, wherein the direction determining module comprises:
a horizontal direction determining sub-module configured to determine a horizontal direction vertical to the initial normal of the display unit as the first direction.

33. The apparatus of claim 31, wherein the direction determining module comprises:
a vertical direction determining sub-module configured to determine a vertical direction vertical to the initial normal of the display unit as the first direction.

34. The apparatus of claim 31, wherein the direction determining module comprises:
a first vertical direction determining sub-module configured to determine the first direction according to a size of the display system.

35. The apparatus of claim 31, wherein the direction determining module comprises:
a moving direction determining sub-module configured to determine the first direction according to moving information of the display system.

36. The apparatus of claim 35, wherein the moving direction determining sub-module comprises:
a direction determining unit configured to determine a reference direction corresponding to the moving information of the display system as the first direction according to a mapping relation between the moving information of the display system and the reference direction.

37. A display control apparatus, comprising:
a processor, a communication interface, a memory and a communication bus, wherein the processor, the communication interface and the memory finish mutual communication by the communication bus, wherein the memory is configured to store at least one command, and wherein the at least one command enables the processor to execute operations, comprising:
inclining at least one display unit relative to an initial normal of the at least one display unit to change a ratio of pixels distributed along a first direction and a second direction in each effective display region of the at least one display unit of a display system resulting in a changed display system, to adapt to sensitivities of human eyes to visual information in the first direction and the second direction, wherein light emitted by each pixel in the respective effective display regions of the at least one display unit is transmitted according to a visual angle range by at least one lens corresponding to the at least one display unit in the display system, and the first direction and the second direction are parallel with the at least one display unit and orthogonal with each other;

increasing each effective display region of the at least one display unit; and displaying content to be displayed by the changed display system, wherein the display system comprises a light field display, wherein the light field display comprises a display array and a sub-lens array, which are arranged in sequence, wherein the sub-lens array comprises a plurality of lenses in a first array distribution, and wherein the display array comprises a plurality of display units in a second array distribution, and wherein a focal length of the at least one lens or a distance between the at least one lens and the at least one display unit is adjustable;

wherein the inclining comprises:

symmetrically inclining adjacent display units, with respect to the initial normal, by a same angle and opposite in inclining direction, so as to change shapes of effective display regions of the adjacent display units, and wherein an effective display region with a changed shape is an oval, a short axis of the oval is parallel with the first direction, and the changed shape effective display regions of the adjacent display units are in symmetric eccentric distribution.

38. The display control apparatus of claim 37, wherein the at least one display unit is at least two display units.

39. The display control apparatus of claim 37, wherein a distance between the at least one lens and a corresponding display unit of the at least one display unit is adjusted.

40. The display control apparatus of claim 37, wherein multifunctional visual angle information of at least one object in the content is respectively displayed by a plurality of pixels of one display unit of the at least one display unit.

* * * * *